United States Patent Office 3,503,118
Patented Mar. 31, 1970

3,503,118
OXIDATION RESISTANT GRAPHITE
COMPOSITE ARTICLE
John M. Criscione, Broadview Heights, and Herbert F.
Volk, Parma, Ohio, assignors to Union Carbide Corporation, a corporation of New York
No Drawing. Filed Dec. 14, 1964, Ser. No. 418,297
Int. Cl. C23c 9/02; B23k 31/02
U.S. Cl. 29—472.9       3 Claims

ABSTRACT OF THE DISCLOSURE

A graphite substrate having a contiguous coating of elemental iridium characterized by resistance to oxidation at elevated temperatures.

---

The present invention relates to composite graphite articles which exhibit superior properties at high temperature. More particularly, the present invention relates to the use of iridium in the making of composite graphite articles.

Graphite is a well known structural material which lends itself advantageously to high temperature applications in view of the exceptional physical and mechanical properties which it exhibits under such conditions. However, in oxidizing atmospheres, graphite is readily attacked at high temperature with the resultant formation of gaseous oxides which do not afford any protection against further oxidation.

Considerable efforts have been made in the past to develop a coating which would avoid oxidation of graphite at high temperatures so that the attractive high temperature properties of graphite could be more fully utilized. Among the most satisfactory coatings thus far developed for graphite articles is silicon carbide which material protects graphite for extended periods at temperatures up to about 1650° C. However, at higher temperatures, silicon carbide dissociates and leaves the graphite unprotected as a consequence of which the article is rapidly destroyed.

The use of coating metals such as platinum and palladium have been considered in view of their known resistance to oxidation. However, such materials have been found to be permeable to oxygen at high temperatures thus leading to the substantial erosion of graphite substrates even though the coating metal itself is not significantly oxidized.

Consequently, up to the present, no completely satisfactory coating has been provided for graphite under oxidizing conditions at temperatures on the order of 2000° C.

It is therefore an object of the present invention to provide a composite graphite article for use at elevated temperatures substantially above 1700° C.

It is another object of the present invention to provide a graphite substrate which is resistant to oxidation at temperatures on the order of 2000° C.

It is a further object of the present invention to provide a graphite substrate with a relatively thin coating whereby the coated graphite is protected from oxidation at temperatures on the order of 2000° C.

Other objects will be apparent from the following description and claims.

Broadly, the present invention comprises a graphite substrate having a relatively thin and firmly adhering coating of iridium.

It has been believed in the past, that a molten metal will not wet a graphite substrate, and thus not provide a strong bond therewith, unless a carbide is formed at the metal-substrate interface. It has been discovered however, that even though iridium is applied, so as not to form a carbide upon contact, in the molten state, with graphite, a strongly adhering iridium coating can nevertheless be provided as hereinafter more fully described. It has further been discovered that the iridium coating of the present invention is highly oxidation resistant and is essentially impermeable to oxygen at temperatures up to 2000° C. and above and as a result the graphite substrate is protected from attack with the use of relatively thin coatings in the order of 1 to 10 mils.

In a particular embodiment of the present invention, a graphite substrate is provided with an iridium coating by applying a slurry of finely divided iridium powder to a graphite surface; heating the slurry-coated graphite to drive off the liquid slurry constituents and thereby cause the iridium powder to adhere to the graphite; and subsequently heating the graphite substrate to about 2120° C. to cause sintering of the iridium particles whereby the particles coalesce and become bonded to the graphite.

In practicing this embodiment of the present invention, fine iridium particles, suitably sized on the average from 1.0 to 3.0 microns (as measured by Fisher Subsieve) prepared, for example, by dry milling larger (—325 mesh) particles, are incorporated into a slip by ball milling the fine iridium particles with the suspending liquid for about two hours. A suitable suspending liquid is xylene, as the slip vehicle, containing a suitable deflocculant such as cyclopentadiene resin. Other suitable slip vehicles are toluene, benzene, alcohol and high flash naptha and other suitable deflocculants are glycerine, stearic acid, polyvinyl alcohol. In general, a ratio of slip vehicle to deflocculant of about 4:1 by volume, and an iridium content in the suspending liquid of about 87 percent by weight provides highly satisfactory results.

The graphite substrate to be coated, which can be in the form of rods, heater elements, crucibles and the like, are dipped in the slurry. Alternatively, the slurry may be applied to the graphite body by spraying or painting.

In any event, the slurry is applied to the substrate surface until the surface is covered with a suitable iridium layer e.g. between 0.0001 and 0.003 inch thick.

The slurry-coated graphite article is dried by heating in a non-reactive atmosphere, e.g., argon, to cause the liquid constituents of the slurry to be vaporized whereupon the iridium particles are caused to adhere to the graphite substrate. Heating, at a rate of about 100° C./hour, to 400° C.±20° C. and holding at a temperature for about one hour provides a suitable preliminary coating. Heating at rates faster than 175° C. per hour is not recommended since higher heating rates can possibly cause disruption of this preliminary coating.

Following the aforedescribed heating treatment, the graphite substrate is further heated, in a non-reactive atmosphere, in the range of 1730° C. to 2130° C. to cause sintering of the deposited iridium and bonding of the iridium particles to each other and to the graphite. Heating at a temperature of about 2120° C. for about 30 minutes is generally satisfactory. The resultant iridium coating is essentially graphite-free and continuous although the identity of original iridium particles can be detected visually.

The sintered iridium coated graphite article obtained in the foregoing manner is characterized by having a coating which is strongly adhering and very resistant to thermal shock.

For example, a ½ inch diameter rod of graphite was coated over a length of 3½ inches, using the aforedescribed technique, with a 0.0026 inch thick coating of iridium. The coated specimen was tested by: (1) heating in vacuo to 2000° C. in 30 seconds, (2) holding at 2000° C. per one minute, and (3) cooling to less than 400° C. in approximately 3 minutes. This procedure was repeated ten times after which the specimen was inspected visually at 30×. No cracks or other damage was apparent as a result of the testing.

A further specimen was cycled twenty times, in vacuo, from 500° C. to 2000° C. without any sign of damage to the coating; each cycle represents twenty seconds to reach 2000° C. and two minutes for cooling to 500° C.

A particular advantage of the aforedescribed embodiment of the present invention is that practically any thickness of iridium on the graphite substrate can be obtained, for example from about 0.5 to 10 mils by repeating the aforedescribed slurry-coating, drying, and sintering steps.

In a further embodiment of the present invention, the previously described slurry coating and heating steps are followed except that the final heating is conducted at above 2130° C. preferably between 2140° C. and 2200° C. Under these conditions, the iridium particles coalesce by melting and a fused, instead of sintered coating is obtained. The fused coating is homogeneous except for containing re-crystallized graphite, in an amount of between about 1 to 5%, which apparently comes out of solution when the melted iridium solidifies, and this condition has been found to contribute to the adherency and thermal shock resistance of the coating. Due to the tendency of fused coatings to run however, the maximum thickness obtainable is about 0.5 mil whereas sintered coatings can be made to practically any desired thickness.

In another embodiment of the present invention, the graphite substrate is treated to provide a sintered iridium coating, i.e. the final heat treatment is in the range of 1730° C. to 2130° C. The iridium coating obtained is then polished to a mirror finish and iridium foil, between 1 and 10 mils thick, is placed in close contact with the polished surface. The assembly is then heated to cause a bonding of the iridium foil to the polished iridium sintered coating. This heating can be conducted at temperatures from about 1800° C. to 2200° C. for from about 20 minutes to one hour. Higher temperatures (above 2130° C.) and the longer heating times (30 minutes or more) serve to convert the sintered coating to a fused coating which tends to strengthen the bond, particularly at the graphite surface. The creation of a fused coating limits the thickness which can be obtained as hereinabove mentioned. Subsequent to this treatment, the article is again slurry coated and heated in the range of 1730° C. to 2130° C., as in the first treatment, to provide an outer sintered coating. Iridium coated graphite articles prepared in this manner exhibit superior resistance to oxidation at temperatures in the excess of 2000° C., the coating remaining pore-free with no evidence of erosion of the graphite substrate and in addition having excellent thermal shock resistance, as hereinafter more fully described.

Instead of being sintered, the inner and outer coatings can be fused, however, the obtainable thickness of the inner and outer coatings, particularly the outer coating thickness, is limited by the tendency of the coating to "run."

In a still further embodiment of the present invention, iridium foil, e.g., from 1 to 10 mils thick is placed between and in contact with separate graphite substrates and heated, in a nonreactive atmosphere to a temperature in excess of 2450° C., preferably 2600° C.±25° C. so as to cause the iridium to melt and wet the graphite surfaces in contact therewith. Upon re-solidification, the iridium forms a strong bond between the carbon substrates which is effective at temperatures up to 2000° C. and above.

This bond is very strong and tests have shown that mechanical failures occur in the carbon substrate and not in the iridium graphite bond.

A characteristic feature of the composite articles of the present invention is that the bond between the iridium coating and substrate is essentially a metal to graphite bond, there being substantially no carbide present at the interface between the coating and substrate. Tests have failed to detect as little as one percent carbide in the composite article.

This is unusual in view of the previously held view that graphite is wet, by molten metal and hence bonded, only when a carbide is formed. Moreover, the absence of carbide is advantageous since carbon-iridium interdiffusion is largely avoided. Consequently, the iridium is not consumed by carbide formation and therefore relatively small amounts of iridium and relatively thin coatings can be employed to provide oxidation protection for graphite substrates.

The following examples will further illustrate the present invention.

Example I

A slurry was prepared by ball milling iridium powder of 2.3 microns average particle size with xylene containing cyclopentadiene deflocculant. The ratio of xylene to deflocculant was 3.6:1 by volume. The iridium powder constituted about 87% by weight (19.5% by volume) of the slurry.

A graphite rod (5 inches long x ⅜ inch diameter) weighing 13.35 grams was polished and dipped to a depth of 3 inches into the slurry of iridium powder to provide a coating, after drying, of about 0.6 mil thick. A single dipping in the slurry, leaving the specimen immersed for about 5 seconds, will provide this thickness.

The slurry-coated graphite specimen was dried by heating in argon at 400° C. for about one hour to drive off the volatile slurry constituents. After this treatment the film of iridium powder was adherent enough so that it could be inspected for uniformity and weighed without damage. The weight of iridium was 0.843 gram.

After determining by visual inspection that the slurry coating uniformly covered the graphite, the specimen was placed in a graphite capsule and supported at its uncoated end.

The capsule was then placed in a graphite tube furnace and heated to 2120° C. and held at this temperature for 30 minutes. An argon atmosphere was provided in the capsule during the heating treatment.

The article obtained in the foregoing manner was found to have a strongly adherent sintered iridium coating about 0.5 mil thick, essentially free of carbides and graphite.

Example II

The procedure of Example I was followed except that the final heating was conducted at 2140° C. for 30 minutes.

The coating obtained was fused coating and was not as smooth as in Example I and there is a tendency for the iridium to "run-off" thus limiting the maximum fused coating thickness that can be obtained to about 0.5 mil. The fused iridium coating was characterized by containing graphite crystallites in an amount of about 1% by weight which derived from re-crystallized graphite that came out of solution when the molten iridium at the iridium-graphite interface solidified.

Example III

A graphite specimen (5 inches long x ½ inch diameter) weighing about 15.65 grams was coated with iridium over a length of 3.6 inches by repeating the procedure of Example I seven times. The total thickness of the sintered iridium coating obtained was approximately 2.6 mils and the total weight of iridium was 5.73 grams.

The coated specimen was arranged so that the upper end thereof (one inch of the coating) was mounted inside an induction coil whereby it was heated to 2050° C.±50° C. for one hour in air; the uncoated lower end of the specimen was cooled by immersion in water.

After completion of the test, the specimen was sectioned and metallographic observation showed that the graphite substrate was unaffected by the testing and had been completely protected by the iridium coating.

An uncoated graphite rod would have been destroyed in a matter of minutes under similar test conditions.

Example IV

A graphite specimen (4 inches long x 3/8 inch diameter) weighing about 13.5 grams was coated three times with iridium over a length of approximately 3 inches. The first coating was about 0.2 mil, following the procedure of Example II, the second coating was 1.1 mil following the procedure of Example I, and the third coating was 1.1 mil also following the procedure of Example I. The total thickness of the iridium coating was approximately 2.4 mils and the total weight of iridium was 3.41 grams. The test specimen thus prepared was tested for thermal shock resistance by cycling ten times in air between room temperature and 2000° C. Each cycle consisted of a one minute heating period to temperature, a one minute hold at 2000° C., and a cooling period of forty-five seconds.

The coated specimen did not show any cracks or other damage to the iridium coating as a result of the test.

Example V

A graphite rod (½ inch diameter, 3 inches in length) was provided with a one mil thick sintered coating of iridium following the procedure of Example I. The sintered iridium coating was polished to a mirror surface and two turns of iridium foil (foil thickness=1.5 mils) were tightly wrapped around the central 3 inches of the rod. The iridium foil was fastened to the rod by tightly wound turns of molybdenum wire.

The assembly was then heated to about 1700° C. in an argon atmosphere to cause preliminary bonding of the iridium foil to the sintered coating. The molybdenum wire was then removed and the rod was heated in argon to 2150° C. for about 20 minutes so as to cause further bonding of the foil with the initial coating.

Subsequent to this latter treatment, the specimen was provided with an outer sintered iridium coating, following the procedure of Example I. The resultant article thus comprises a graphite substrate having a first coating which was essentially sintered iridium, an intermediate coating of iridium foil, and an outer coating of sintered iridium.

The final coating after a rough polishing ranged from 0.0045 to 0.0050 inch in thickness.

The coated article prepared in the foregoing manner was subjected to an arc plasma jet, in air, at atmospheric pressure, for twenty minutes at 2050° C. On sectioning and metallographic examination, it was found that the coating had remained pore-free and there was no evidence of any erosion of the graphite underneath the coating.

Example VI

A flat sheet of iridium (1 cm. x 1 cm. x 0.25 mm. thick) was placed centrally between the flat surfaces of two pieces of graphite (2.5 cm. diameter x 1.3 cm. high) and heated in argon for ½ hour at 2750° C. at which temperature iridium is molten. The only pressure applied was that due to the weight of the upper graphite piece which was approximately 13 grams. It was found that the graphite pieces were strongly bonded together by this treatment.

The bonded specimen was cut in half along a plane normal to the iridium-graphite joint and one of the sections obtained was broken in a transverse bend test to obtain an estimate of the bond strength. Failure occurred in the graphite substrate.

The foregoing procedure was repeated at bonding temperatures of 2600° C. and 3000° C. and the results obtained were essentially the same as for a bonding temperature of 2750° C.

In view of the foregoing, it can be seen that graphite substrates having relatively thin iridium coatings, i.e. between 1 and 10 mils were protected against oxidation at temperatures up to 2000° C. This effect is due to the fact that the iridium coatings can be made strongly adherent and essentially free of carbide while also being essentially impermeable to oxygen at elevated temperatures.

This behavior of iridium as a graphite coating is rather remarkable, in view of the performance and properties of other platinum metals.

Non-reactive gases which can be employed in the heat treatments described above include all the inert gases, hydrogen and nitrogen; mesh sizes are Tyler Series.

What is claimed is:

1. A graphite substrate resistant to oxidation at temperatures up to 2000° C., said substrate having an essentially carbide-free adherent contiguous outer surface coating formed of a fusion of finely divided particles of iridium, said coating containing crystals of graphite derived from the graphite substrate.

2. A method of providing a graphite substrate with an adherent iridium coating which comprises:
   (1) preparing a slurry of finely divided elemental iridium powder,
   (2) applying the slurry to a graphite substrate,
   (3) heating the slurry coated graphite substrate in a non-reactive atmosphere to drive off the volatile constituents of the slurry, and
   (4) further heating the coated graphite substrate at a temperature above 2130° C. for a time sufficient to provide a fused iridium coating containing re-crystallized graphite.

3. A method for providing a graphite substrate with an adherent iridium coating which comprises:
   (1) applying a slurry of finely divided iridium powder to the surface to be coated,
   (2) heating the slurry coated graphite in a non-reactive atmosphere to drive off the volatile constituents of the slurry,
   (3) further heating the graphite substate in a non-reactive atmosphere to a temperature between 1800° C. and 2200° C. and maintaining the substrate in this temperature range for a time sufficient to provide an adherent coating formed of coalesced iridium particles,
   (4) polishing the iridium coating,
   (5) arranging iridium foil in contact with the polished iridium coating,
   (6) heating said substrate and foil in a non-reactive atmosphere to a temperature in the range of 1800° C. to 2200° C. for a time sufficient to cause bonding of the iridium foil to the iridium coating,
   (7) and repeating steps (1) through (3) to provide the thus bonded foil with an adherent iridium coating formed of coalesced iridium particles.

References Cited

UNITED STATES PATENTS

| | | | |
|---|---|---|---|
| 2,778,786 | 1/1957 | Pearlman et al. | 204—47 X |
| 2,876,139 | 3/1959 | Flowers | 117—71 X |
| 3,024,522 | 3/1962 | Cacciotti | 29—195 |
| 3,054,694 | 9/1962 | Aves | 117—70 |
| 3,065,532 | 11/1962 | Sachse | 29—195 |
| 3,099,575 | 7/1963 | Hill | 117—22 X |
| 3,122,424 | 2/1964 | King | 29—195 |
| 3,212,930 | 10/1965 | Thompson et al. | 136—120 X |
| 3,293,064 | 12/1966 | Aves. | |

OTHER REFERENCES

Schulz et al.: Research and Development on Advanced Graphite Materials, vol. XXXIV, Oxidation-Resistant Coatings for Graphite Technical Documentary Report No. WADD TR 61–72, July 1964, pp. 16, 17.

RALPH S. KENDALL, Primary Examiner

U.S. Cl. X.R.

29—191.6, 195, 473.1, 492; 117—22, 118, 160; 161—182, 213